United States Patent [19]

Tahara et al.

[11] Patent Number: 5,579,037
[45] Date of Patent: Nov. 26, 1996

[54] METHOD AND SYSTEM FOR SELECTING OBJECTS ON A TABLET DISPLAY USING A PEN-LIKE INTERFACE

[75] Inventors: Yoshinori Tahara; Naomi Miyamoto; Hirokazu Yasumuro, all of Kanagawa, Japan

[73] Assignee: International Business Machines Corporation, Armonk, N.Y.

[21] Appl. No.: 267,997

[22] Filed: Jun. 28, 1994

[30] Foreign Application Priority Data

Jun. 29, 1993 [JP] Japan .................................. 5-159420

[51] Int. Cl.$^6$ ...................................................... G06F 3/033
[52] U.S. Cl. .......................................... 345/173; 345/127
[58] Field of Search ........................... 345/173, 179, 345/180, 182, 183, 127, 128, 129, 130, 131, 902; 178/18, 19

[56] References Cited

U.S. PATENT DOCUMENTS

| | | | |
|---|---|---|---|
| 4,667,182 | 5/1987 | Murphy | 345/179 |
| 5,119,079 | 6/1992 | Hube et al. | 345/173 |
| 5,289,168 | 2/1994 | Freeman | 345/127 |

*Primary Examiner*—Richard Hjerpe
*Assistant Examiner*—Kara Farnandez Stoll
*Attorney, Agent, or Firm*—George E. Grosser; Andrew J. Dillon

[57] ABSTRACT

A method and system is provided wherein the information displayed in a predetermined area containing the predetermined position on the screen corresponding to the plane position of the point of a substantially pen-shaped pointing means is displayed in an enlarged form on said display means when the distance between the point of said pointing means and the screen of said display means is less than or equal to a first predetermined value and greater than a second predetermined value, where said second value is smaller than said first predetermined value. The state where the information which was displayed in said predetermined area is displayed in an enlarged form is maintained regardless of the change of the plane position of the point of said pointing means while said distance becomes said second predetermined value or smaller. The information which is displayed at a contact position or at a spaced position is selected when the point of said pointing means comes in contact with the screen or, alternatively, when the point is lifted from the screen after the point comes in contact with the screen.

12 Claims, 8 Drawing Sheets

METHOD AND SYSTEM FOR SELECTING OBJECTS ON A TABLET DISPLAY USING A PEN-LIKE INTERFACE

BACKGROUND OF THE INVENTION

1. Technical Field

The invention relates in general to a method and system for selecting objects displayed on a tablet using a pen-like pointing device and particularly to a method and system for selecting an object from among a large number of objects on a tablet.

2. Description of the Related Art

There are systems known in the art which allow a desired object to be selected from among a plurality of objects displayed on a screen (e.g., icon, etc.). Such objects are displayed on a predetermined portion of the screen by a tapping operation that brings the point of a stylus (pen) into contact the predetermined portion on a tablet. It is also known that a predetermined area containing a predetermined portion indicated by a stylus is partially displayed in an enlarged form (zoom in) so that a specific object can be easily selected from among a large number of displayed objects to be selected.

For example, JA PUPA (Japanese Published Unexamined Patent Application) 57-41731 discloses a coordinate input device which reads graphic objects, stores its image data in a storage device, displays the image data stored in the storage device on a display, and inputs the coordinates of a specific position of an image on the screen of said display. Taking a position predetermined on the screen of a display as the center, the image in a fixed area is enlarged and stored in the graphic memory (so-called dot plane), and is displayed along with the coordinates of said specific position which are inputted by using the displayed image in an enlarged form.

In addition, JA PUPA 59-57336 discloses a technique which displays an enlarged image in response to an image enlargement signal and inputs the coordinates of an arbitrary position in an enlarged image. Furthermore, JA PUPA 59-57336 discloses a keyboard device which has a key display section displayed with dot matrix. When a stylus is in contact with the display section, the key displayed at the contact point is enlarged to a size large enough for operator manipulation. Other keys are displayed as small as possible in a range where the contents of the key top (characters indicated on the top of each key) can be identified visually.

In the prior art techniques, the area to be displayed in an enlarged form must be determined in accordance with the coordinates of the portion where the stylus is in contact on the screen before the display is carried out in an enlarged form. Thus, the display in said region is to be scrolled at a high speed whenever the operator moves the stylus along the plane to indicate a specific object, etc. in the region displayed in an enlarged form. Therefore, the prior art technique is disadvantageous because it is difficult to select a specific portion in said displayed region in an enlarged form by pointing to it.

Therefore, it is an object of the present invention to provide a method and system for selecting objects on a screen wherein any object may be easily selected from among a large number of displayed objects.

SUMMARY OF THE INVENTION

According to the present invention, a method and system is provided wherein the information displayed in a predetermined area containing the predetermined position on the screen corresponding to the plane position of the point of a substantially pen-shaped pointing means is displayed in an enlarged form on said display means when the distance between the point of said pointing means and the screen of said display means is less than or equal to a first predetermined value and greater than a second predetermined value, where said second value is smaller than said first predetermined value. The state where the information which was displayed in said predetermined area is displayed in an enlarged form is maintained regardless of the change of the plane position of the point of said pointing means while said distance becomes said second predetermined value or smaller. The information which is displayed at a contact position or at a spaced position is selected when the point of said pointing means comes in contact with the screen or, alternatively, when the point is lifted from the screen after the point comes in contact with the screen.

In addition, in a preferred embodiment of the invention, it is desirable that, in a state where a display means displays information in an enlarged form, a display means cancels the state where said display means displays said information in an enlarged form when the plane position which was detected by a detection means goes out of the area corresponding to the region where said information is displayed in an enlarged form on said screen.

Furthermore, in a preferred embodiment of the present invention, it is desirable that, in a state where a display means displays information in an enlarged form, a control means cancels the state where said display means displays said information in an enlarged form when said distance detected by said detection means is greater than said first predetermined value $D_1$.

In accordance with one aspect of the present invention, when said predetermined objects are those representing a large number of kanji characters, a control means selects desired kanji characters which are displayed at said contact position.

In accordance with another aspect of the present invention, if said objects or information represent a geographical map, the control means selects the geographical object at a point on the map which is displayed at said contact position when the point of the pointing means comes in contact with the surface of the screen.

In accordance with still another aspect of the present invention, the system displays predetermined information on a display means, displays information which was displayed in a predetermined area containing the predetermined position on the screen corresponding to the plane position of the point of a substantially pen-shaped pointing means in an enlarged form. When the distance between the point of the pointing means and the screen of said display means is equal to or smaller than a first predetermined value $D_1$ and greater than a second predetermined value $D_2$ which is smaller than said first predetermined value. The system maintains the state where information which was displayed in said predetermined area is displayed in an enlarged form regardless of the change of the plane position of the point of said pointing means when said distance is equal to or smaller than said second predetermined value, and selects the information which is displayed at a contact position of the point of the pointing means.

The operation of the system of the present invention is as follows. The plane position (coordinates) of the point of a substantially pen-shaped pointing means and the distance between the point of said pointing means and said screen are detected by a detection means. The information which is displayed in a predetermined area containing the predetermined position on the screen corresponding to said plane position is displayed on a display means in an enlarged form when said distance detected by said detection means is within a predetermined range (equal to or smaller than a first predetermined value $D_1$ and greater than a second predetermined value $D_2$ which is smaller than said first predetermined value). The state when the information is displayed in an enlarged form which was displayed in said predetermined area, regardless of the change of the plane position detected by a detection means, is maintained when said distance is equal to or smaller than said second predetermined value.

In addition, determination is made as to whether the information displayed at a contact position is selected when the point of said pointing means comes in contact with the screen or alternatively, when the point is lifted from the screen after the point comes in contact with the screen. Therefore, the operator can fixedly display information which is displayed in said predetermined area by making the distance between a predetermined portion, indicated by the pointing means, and the screen less than or equal to a first predetermined value and, after the information which is displayed in said predetermined area among the displayed information is displayed in an enlarged form, making said distance equal to or smaller than a second predetermined value.

In this way, the operator may move the point of the pointing means within a plane such that the distance from the point to the surface of the tablet is less than or equal to a second predetermined value, and target information will be selected easily because the information displayed in an enlarged form would not be scrolled. In addition, when the operator looks for a target object from among the information which is displayed in an enlarged form, the lack of scrolling helps because information which is displayed in an enlarged form is not scrolled by moving the plane position of the point of the pointing means by hand movement, so holding the pointing means within a specific area does not scroll information which is displayed in an enlarged form. Therefore, this facilitates selecting any information from among a large number of pieces of information (objects).

Furthermore, in a state where information is displayed in an enlarged form, it is desired that the state where information is displayed in an enlarged form be canceled when the plane position of a predetermined portion goes beyond the area corresponding to the region where information is displayed in an enlarged form on the screen or said distance becomes greater than the first predetermined value. In this way, the operator can easily cancel the state where information is displayed in an enlarged form when it is determined that target information being searched for is not displayed in the region where the information is displayed in an enlarged form.

In addition, predetermined information to be displayed on a display means can be in several forms, such as information representing kanji characters or the information representing a map. However, the predetermined information is not limited to the above.

In accordance with one aspect of the invention, predetermined information is displayed on a display means. The information which was displayed in a predetermined area on the screen corresponding to the plane position of the point of a substantially pen-shaped pointing means is displayed on a display means in an enlarged form if the distance between the point of said pointing means and the screen of said display means is equal to or smaller than a first predetermined value and greater than a second predetermined, wherein said second value is smaller than said first predetermined value. The state where information which was displayed in said predetermined area is displayed in an enlarged form, remains regardless of the change of the plane position of the point of said pointing means when said distance becomes said second predetermined value or smaller. Information displayed at a contact position or at a spaced position is selected when the point of said pointing means comes in contact with the screen or, alternatively, when the point departs from the screen after being in contact with the screen. Any information can be easily selected from among a large number of pieces of information, similar to the invention as set forth above.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
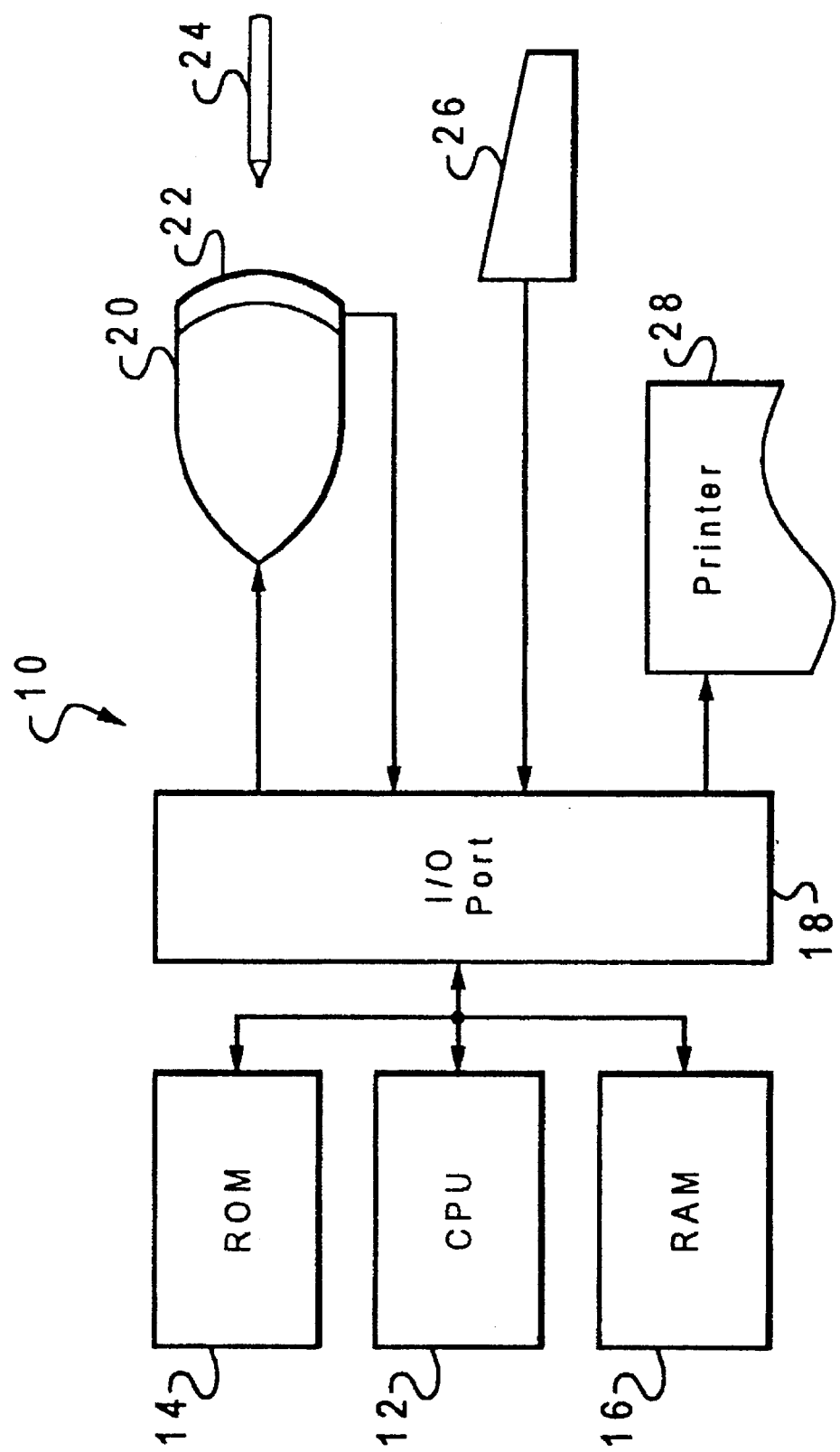
FIG. 1 is a block diagram illustrating a schematic configuration of a personal computer to which the invention is applied.

FIG. 1 illustrates a personal computer 10 to which the invention applies. The personal computer 10 is provided with CPU 12, ROM 14, RAM 16, and I/O port 18. They are coupled to each other through a bus. The I/O port 18 is connected to a display 20 (such as CRT) to display various information. The I/O port 18 is connected to a keyboard 26 for the operator to input various information and a printer 28 in order to print out results.

The screen of the display 20 is provided with an electromagnetic digitizer 22 and the personal computer 10 comprises a pen-shaped stylus 24 for pointing to a predetermined portion on the screen or in the space in front of the screen. The point of the stylus 24 is provided with a conductor. The digitizer 22 is made to detect the plane coordinates (x, y) (coordinate values along the horizontal direction (X-axis direction) of the screen and coordinate values along the vertical direction (Y-axis direction) of the screen, see FIG. 3) of the point of the stylus with respect to the screen 20A of the display 20, and the distance, d, between the point of the stylus 24 and the screen 20A (See FIG. 8). In addition, in the electromagnetic tablet, the technique to obtain the height and coordinates of stylus is described more specifically, for example, in PUPA 1-134519 and PUPA 2-204819, both of which are incorporated herein by reference.

Referring to the flowchart in FIG. 2, the operation of the present invention will be described. This operation is described using an example of processing to select a target kanji character from among a large number of kanji characters for the creation of Japanese documents. A window 40, as shown in FIG. 3, is displayed on a screen 20A of a display 20 while the creation processing of a Japanese document is being carried out. If the operator wants to use predetermined kanji characters which have a comparatively lower frequency of use in creating a Japanese document, the operator brings the point of a stylus 24 into contact with the portion of screen 20A (See FIG. 8 (D)) corresponding to the display position of symbols indicated as "Full-width List" in the window 40 on the screen 20A.

Figure 2:
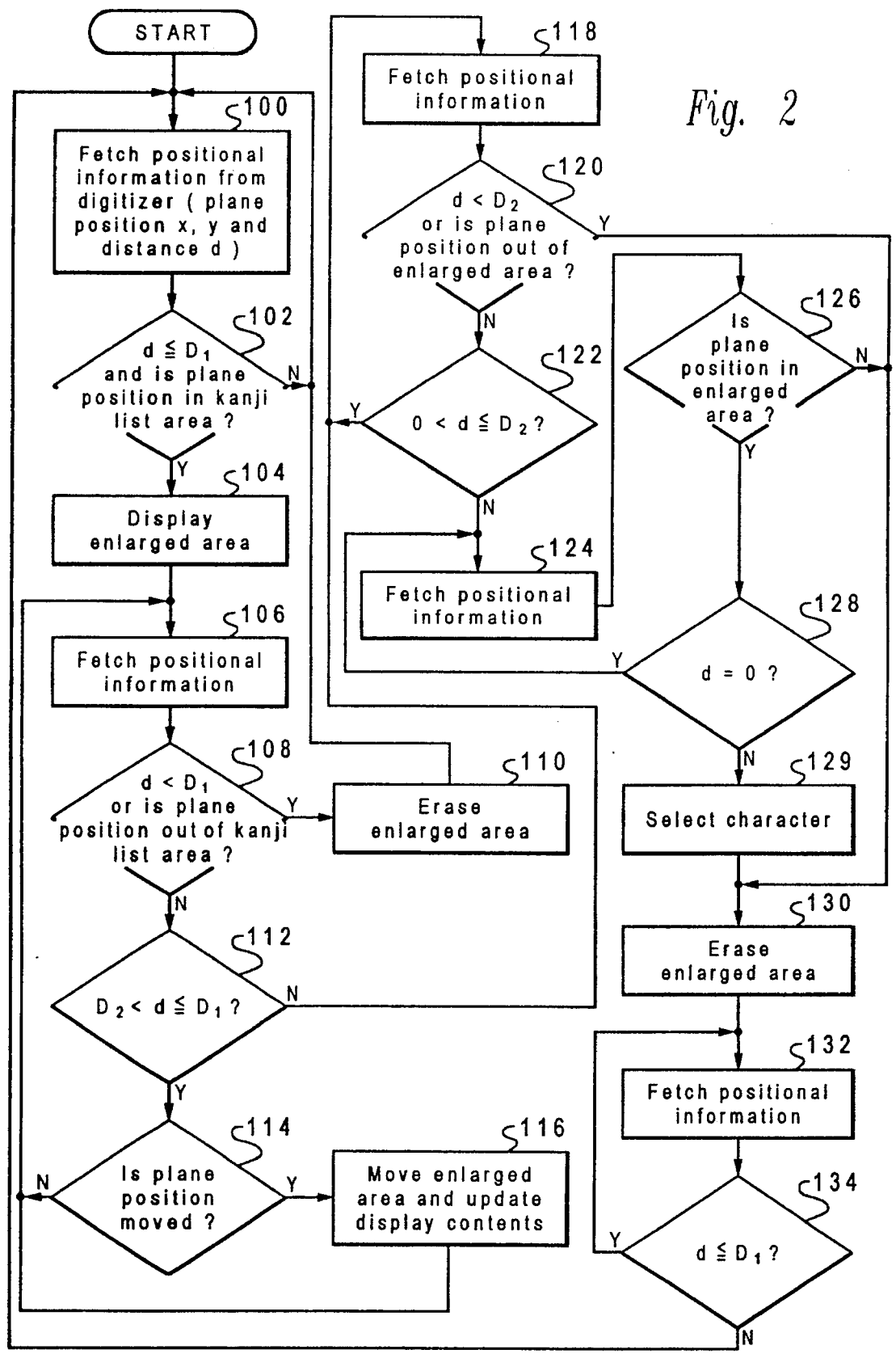
FIG. 2 is a flowchart explaining the logic flow of an embodiment of the invention.
Figure 3:
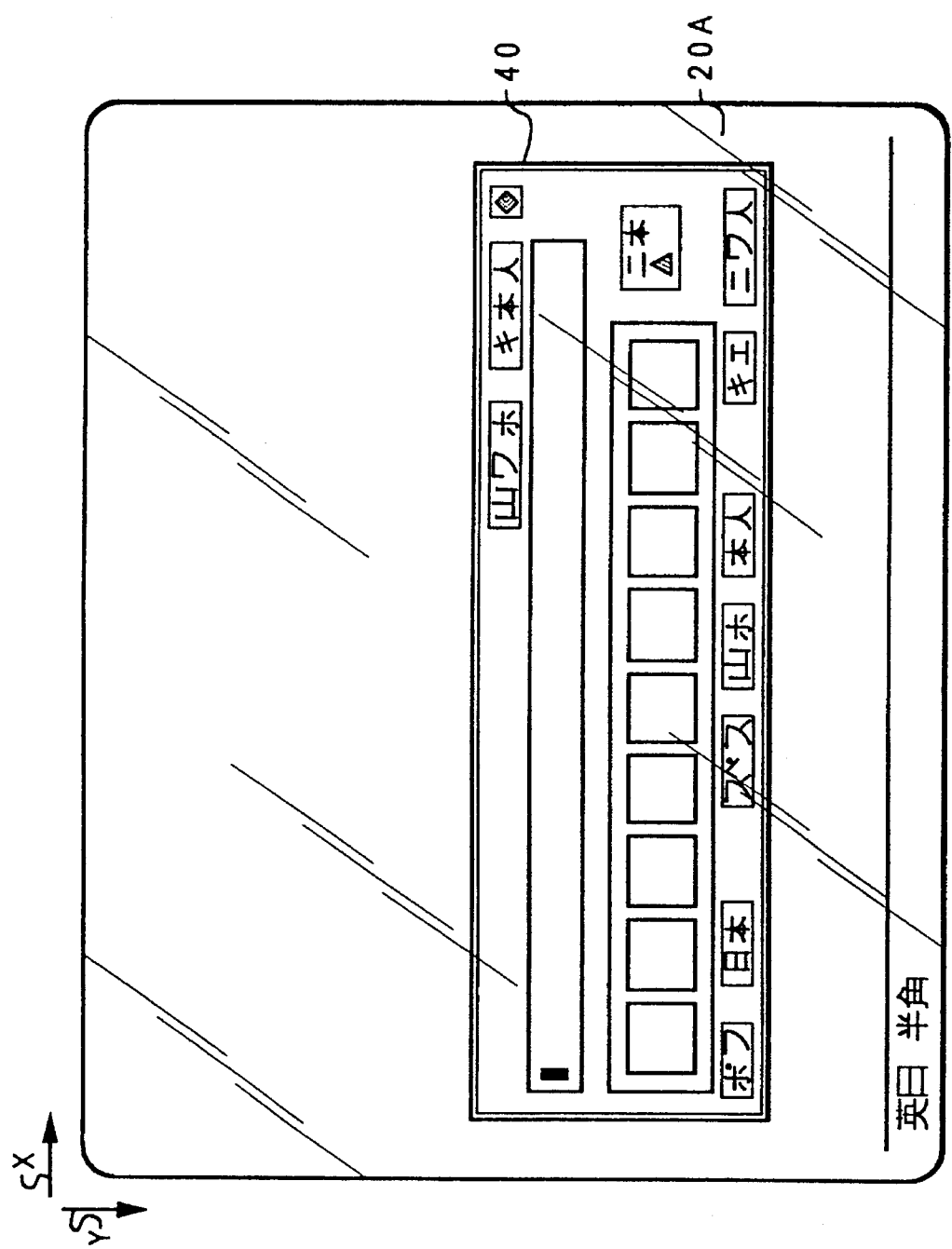
FIG. 3 is a drawing illustrating a window which is displayed while a Japanese document is being created.
Figure 4:
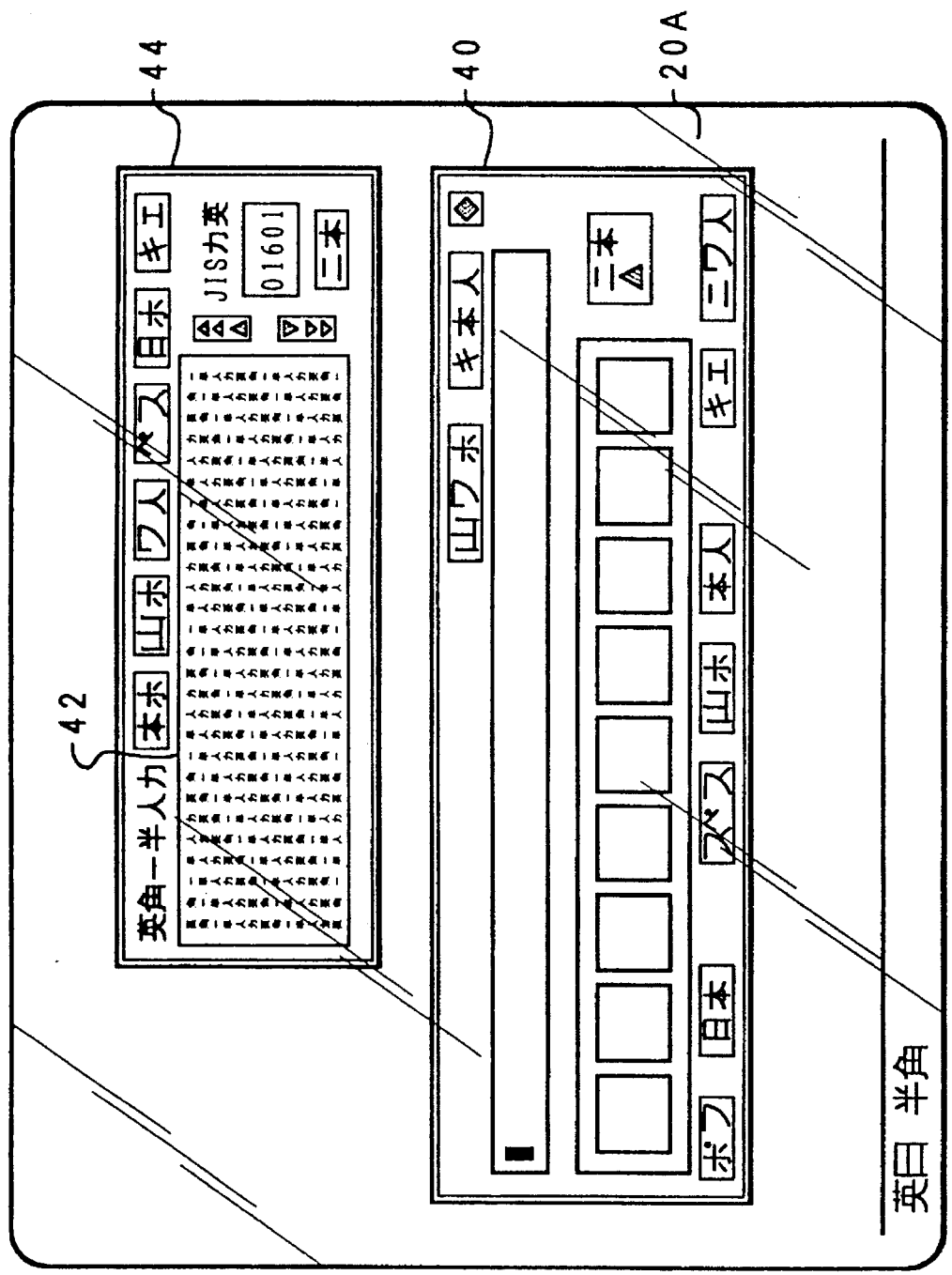
FIG. 4 is a drawing illustrating a state a window provided with a kanji list in which a number of kanji characters are displayed.

In this way, the personal computer 10 displays a window 44, on the screen 20A of the display 20, comprising a kanji list 42 in which a large number of kanji characters are displayed, as shown in FIG. 4, and carries out the processing indicated by the flowchart in FIG. 2. In this kanji list 42, it is difficult to identify individual characters clearly because of the small size of the displayed kanji characters as well as the inherent complexity of kanji characters. However this list allows a large number of kanji characters to be displayed at a time. In addition, a provision is made so that, when the operator indicates a desire to erase the window 44, the operation in the flowchart will end due to interruption.

Figure 5:
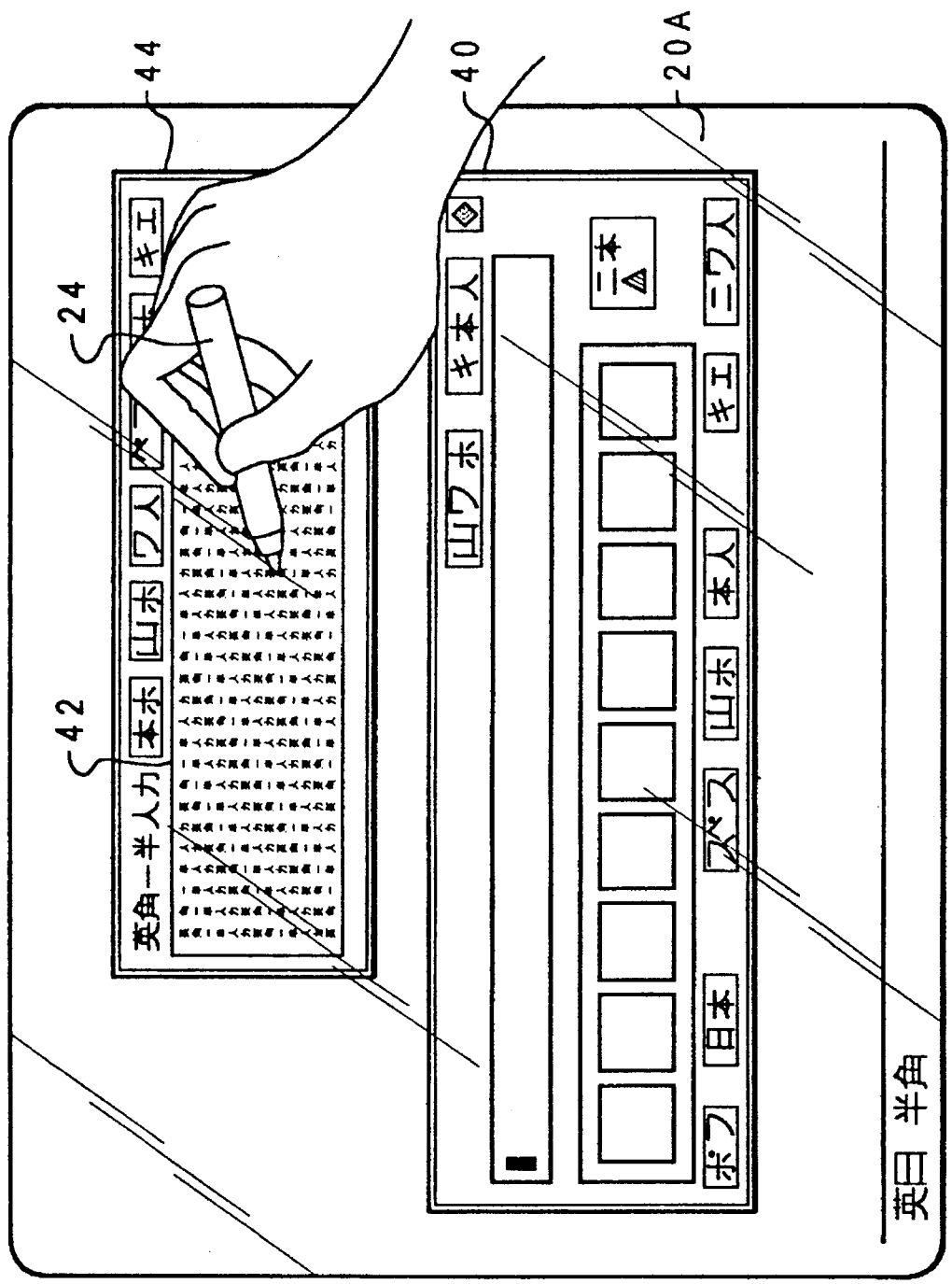
FIG. 5 is a drawing illustrating a case when the plane position of the point of the stylus is in the kanji list area.

In step 100, the coordinates (x, y) which represent the plane position of the point of the stylus 24 and the distance d between said point and the screen 20A detected by the digitizer 22 are fetched. In step 102, it is determined whether said distance d is less than or equal to a first predetermined value $D_1$ (See FIG. 8 (B)) and whether the coordinates (x, y) which represent the plane position of the stylus are located in said kanji list 42 (See FIG. 5). If the condition in step 102 is not satisfied, control will return to step 100 and repeat steps 100 and 102 until the condition in step 102 is met.

Figure 6:
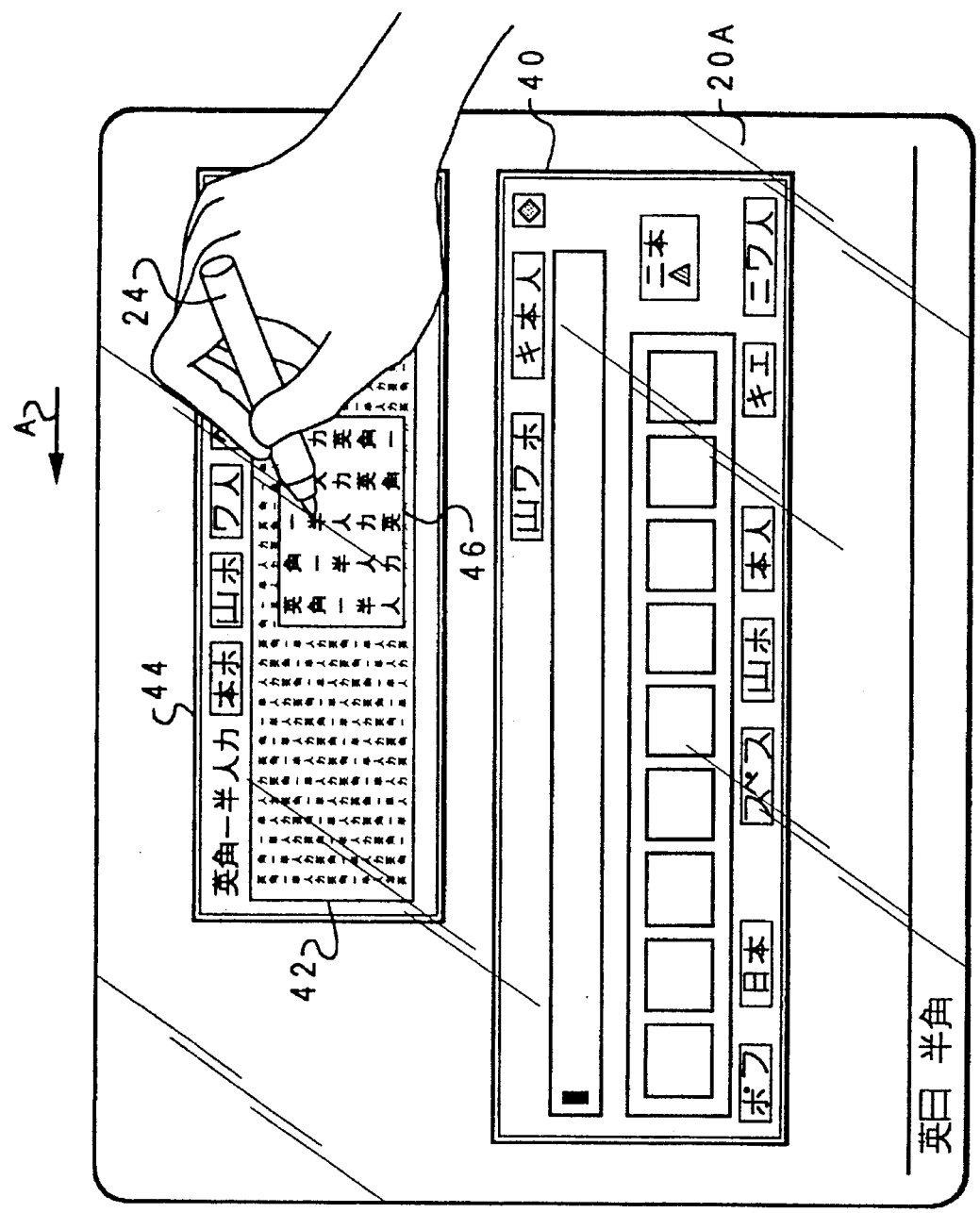
FIG. 6 is a drawing illustrating a case where the distance between the point of the stylus and the screen become a predetermined value or smaller.

In order to select a kanji character, the operator moves the point of the stylus 24 into a space in front of the display portion of the kanji list 42 and moves the point of the stylus to the position in front of the portion where a target kanji character in the kanji list 42 is expected to be located. The operator then brings the point of the stylus 24 close to the screen 20A. When the distance d is less than or equal to the first predetermined value $D_1$, the condition in step 102 is satisfied and control goes to step 104. Kanji characters in a predetermined area in the kanji list 42 are displayed in an enlarged form in a enlarged (zoomed) area 46 centered at said coordinates (x, y), as shown in FIG. 6. The kanji characters displayed in this zoomed area 46 are enlarged so that the operator can easily identify individual kanji characters.

In step 106, the positional information (coordinates x, y and distance d) of the point of the stylus 24 is fetched again from the digitizer 22. In the next step 108, a determination is made as to whether the condition which was previously satisfied in step 102 is no longer satisfied, i.e. whether the distance d has become greater than the first predetermined value $D_1$, or the plane coordinates of the point of the stylus 24 have gone out of the area corresponding to the display portion of the kanji list 42. The operator checks whether the intended target kanji character is contained in the enlarged area 46 by referring to a group of kanji characters. The kanji characters displayed in the kanji list 42 are arranged in the order of Japanese syllables. If, for example, the "reading" of a kanji character displayed in the enlarged area 46 is considerably different (in the order of Japanese syllables) from the "reading" of the target kanji character, it can be seen immediately that the target kanji character is not contained in the zoomed area 46. If a target kanji character is expected to be located substantially further away, the operator lifts up the point of the stylus 24 from the screen 20A. In this case, the condition in step 108 is satisfied because the distance, d, has become greater than the first predetermined value, $D_1$, and the enlarged area 46 is cleared in step 110. Control returns to step 100.

Figure 8:
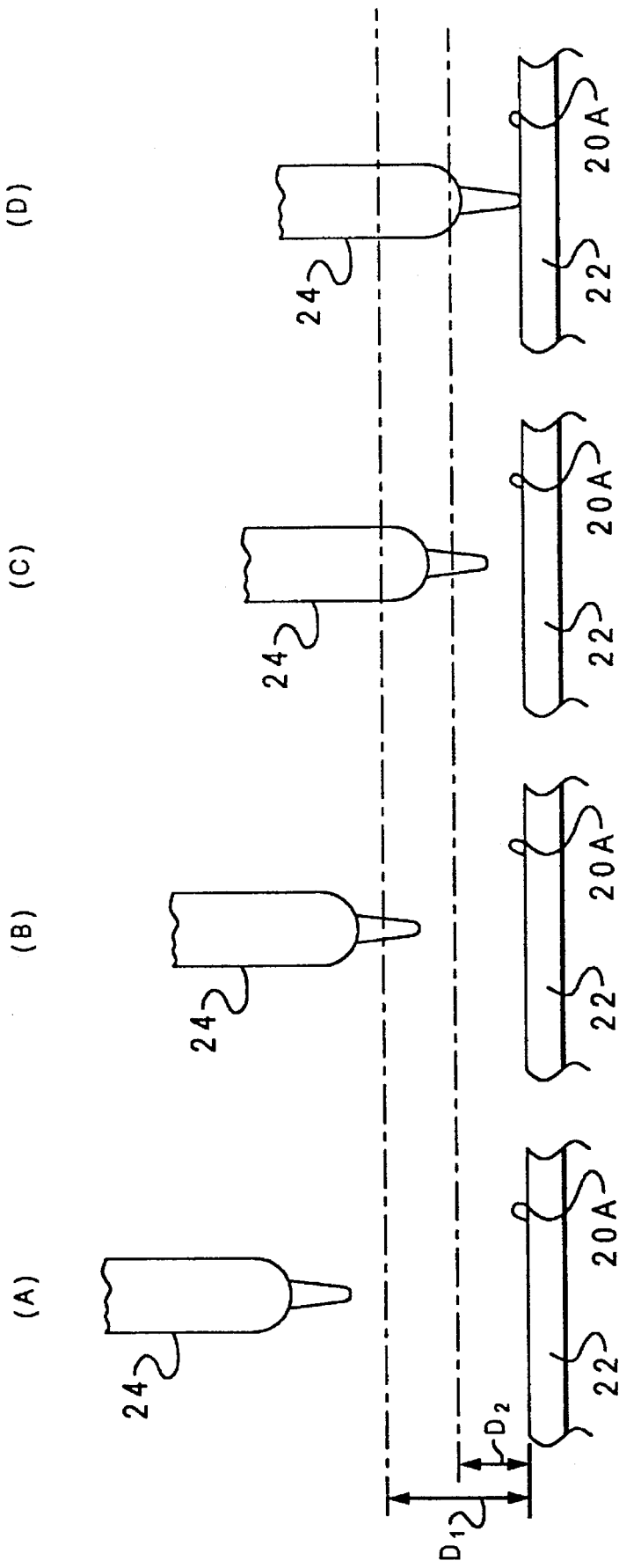
FIG. 8 is a conceptual drawing illustrating the cases where the distance between the point of the stylus and the screen is (A) greater than a first predetermined value $D_1$, (B) less than or equal to the first predetermined value $D_1$ and greater than a second predetermined value $D_2$, (C) less than or equal to the second predetermined value $D_2$ and greater than zero ("0"), and (D) equal to zero ("0").

On the other hand, if the condition in step 108 is not met, control will go to step 112. At this time, it is determined whether the distance d is less than or equal to said first predetermined value $D_1$ and greater than a second predetermined value $D_2$, where $D_2$ is smaller than $D_1$ as shown in FIG. 8 (B). If the condition in step 112 is satisfied, it is determined whether there is a change from the coordinates of the plane position of the point of the stylus 24 which were fetched in step 106, i.e. whether the point of the stylus 24 has moved along the screen 20A. If the point of the stylus has not moved, the condition of step 114 is not satisfied and control will return to step 106.

If it is determined that a target kanji character is located close to, but not among the kanji characters displayed in the enlarged area 46, the operator moves the point of the stylus 24 along the screen 20A, but fixedly maintain the point of the stylus 24 such that the condition in step 112 is maintained. Once the point of the stylus is moved, the condition in step 114 is no longer satisfied, so the enlarged area 46 is moved in accordance with the movement of the stylus 24 and the kanji characters displayed in the enlarged area 46 are updated in step 116. If, for example, the point of the stylus 24 is moved in the direction indicated by the arrow A in FIG. 6, the display position of the enlarged area 46 is moved so that the center position of the enlarged area 46 matches the coordinates x, y, and the area of kanji characters to be displayed in an enlarged form in the enlarged area 46 is moved in the direction indicated by the arrow A, changing the kanji characters displayed in the enlarged area 46.

After the processing in step 116 is complete, control returns to step 106. In this way, if the coordinates x, y of the plane position are in an area corresponding to the kanji list 42 and the distance d is less than or equal to a first predetermined value $D_1$ and greater than a second predetermined value $D_2$ (See FIG. 8 (B)), the enlarged area 46 is moved in accordance with the change in coordinates x, y of the plane position.

On the other hand, if a target kanji character is located very close to the kanji characters displayed in the enlarged area 46, the operator brings the point of the stylus 24 much closer to the screen 20A. In this way, the distance d becomes less than or equal to the second predetermined value $D_2$ and the condition in step 112 is no longer satisfied. Control now goes to step 118.

In step 118, the positional information (coordinates x, y and distance d) of the point of the stylus 24 is fetched again from the digitizer 22. In step 120, a determination is made as to whether or not the distance d becomes greater than the second predetermined value $D_2$ or whether the plane position of the point of the stylus 24 goes out of the area corresponding to the display portion of the enlarged area 46. If the condition in step 120 is not satisfied, step 122 determines whether the distance d is less than or equal to said second predetermined value $D_2$ and greater than zero ("0"), i.e., the stylus 24 is not in contact with the screen 20A. If step 122 is satisfied, control returns to step 118 and steps 118 through 122 are repeated.

Therefore, if the distance d is less than or equal to the second predetermined value $D_2$ and the coordinates of the plane position of the stylus 24 are in the area corresponding to the display portion of the enlarged area 46, the state in which the present enlarged area 46 is displayed is fixedly maintained. Therefore, even if the point of the stylus 24 is moved, for example, in the direction indicated by the arrow A in FIG. 6, the enlarged area 46 remains unmoved and the kanji characters displayed in the enlarged area 46 are not changed.

The operator looks for a target kanji character from among the kanji characters displayed in the enlarged area 46 during this movement. Even if the position of the stylus 24 moves slightly, the enlarged area 46 remains unmoved and unchanged, thereby allowing the operator to look for a target kanji character easily. If the target kanji character is not displayed in the enlarged area 46, the operator lifts the point of the stylus 24 from the screen 20A or moves the stylus 24 so that the plane position goes out of the zoomed area 46. Either action causes, the condition in step 120 to be satisfied and the enlarged area 46 is removed in step 130.

On the other hand, if the target kanji character is displayed in the enlarged area 46, the operator brings the point of the stylus 24 into contact with the screen 20A and moves the point of the stylus 24 so it matches the portion where the target kanji character is displayed. The condition in step 122 is no longer satisfied because of this movement and control goes to step 124. In step 124, the positional information (coordinates x, y and distance d) is fetched again from the digitizer 22. In step 126, it is determined whether or not the plane position of the stylus 24 is in the enlarged area 46. If the condition in step 126 is satisfied, a determination is made in step 128 as to whether the distance d is zero ("0") (See FIG. 8 (D)). If the condition in step 128 is satisfied, control returns to step 124 and steps 124 through 128 will be iterated until the condition in step 126 or in step 128 is no longer satisfied.

Figure 7:
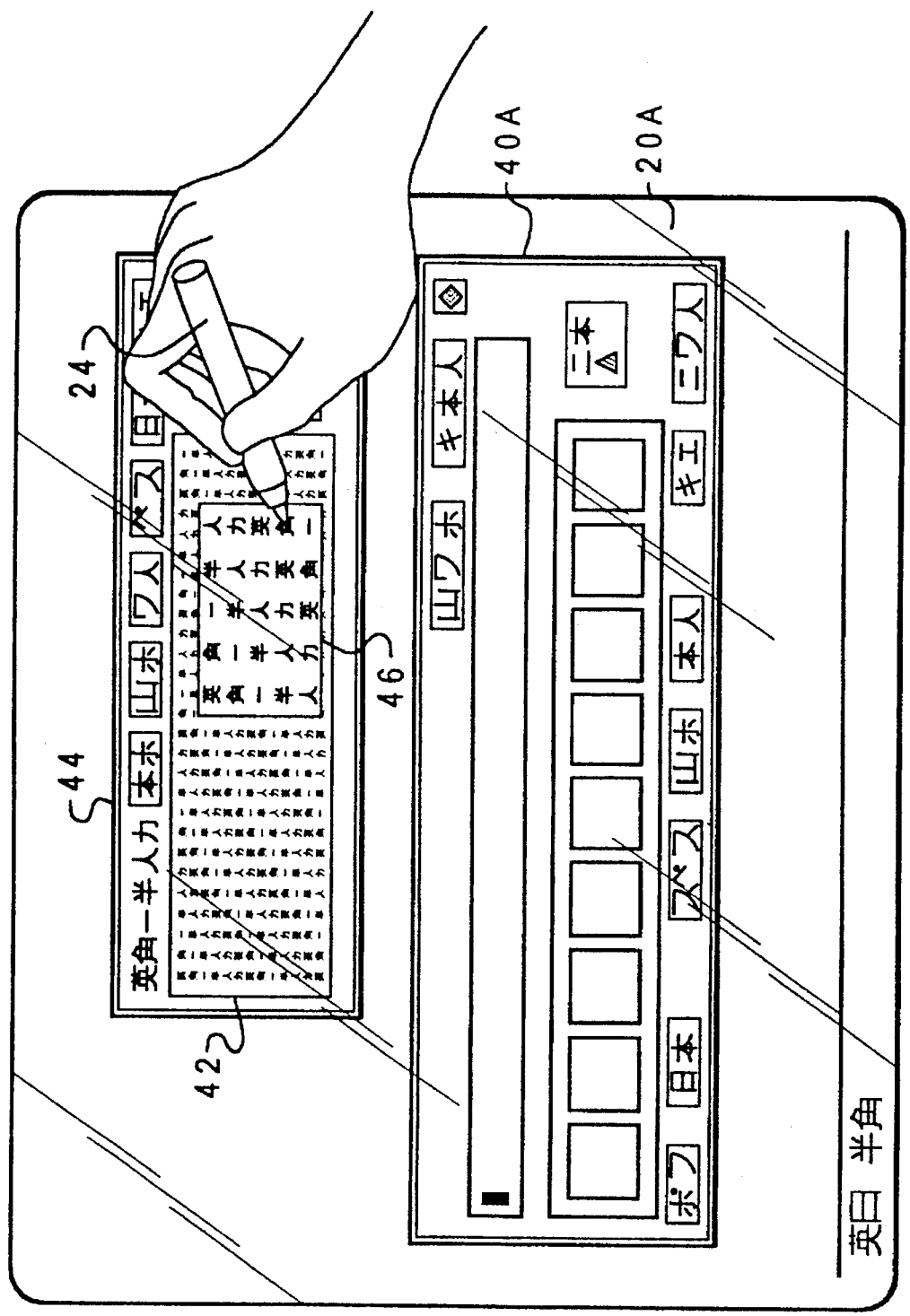
FIG. 7 is a drawing illustrating a case where s predetermined kanji in the enlarged area is selected.

The operator moves the point of the stylus 24 while still in contact with the screen 20A so that it matches the portion where the target kanji character is displayed as shown in FIG. 7 (FIG. 7 shows an example of when the point of the stylus 24 is matched to a kanji character "_(ki)."), and then, lifts the point of the stylus 24 from the screen 20A. In this way, when the condition in step 128 is no longer satisfied, the target kanji character has been selected by the operator's tapping action and control goes to step 129. The operator can select a target kanji character easily because the display position of the enlarged area 46 remains unmoved and the kanji characters displayed in the enlarged area 46 are not changed during this movement.

In step 129, when the point of the stylus 24 departs from the screen, the kanji character which was displayed at the position corresponding to the coordinates of the plane position of the point of the stylus 24, as determined at step 124, is selected based on the coordinates (x, y) of the plane position and additional processing, such as adding the character code of the selected kanji character to the data of the Japanese document being edited or created. In addition, if the plane position of the stylus 24 goes out of the enlarged area 46 before the point of the stylus 24 is lifted from the screen 20A, the condition in step 126 is no longer satisfied and control goes to step 130 where the enlarged area 46 is removed as described above.

In step 132, the positional information (coordinates x, y and distance d) is fetched from the digitizer 22. In step 134, it is determined whether the distance d is less than or equal to a first predetermined value $D_1$. While the condition in step 134 is satisfied, the processing in step 132 is repeated. When the condition in step 134 is no longer satisfied, control returns to step 100.

Thus, in one embodiment of the present invention, if the point of the stylus 24 is lifted up from the screen 20A after the point comes in contact with the screen 20A, the kanji character which was displayed at the position corresponding to the coordinates of the plane position of the point of the stylus 24 is selected. The invention is not limited to this embodiment. Alternatively, the process may be modified so that when the point of the stylus 24 comes in contact with the screen 20A, the kanji character which was displayed at the position corresponding to the coordinates of the plane position of the point of the stylus 24 may be selected.

In addition, although selection of a kanji character in the creation processing of a Japanese document was given as an example in the above, one skilled in the art will recognize that the invention is not limited to this particular embodiment. The invention is very effective in selecting specific information from among a large number of pieces of information, for example, the position of a destination is selected from among a large amount of information on a map, such as seen in a vehicle navigation system.

In addition, although the embodiment employs the radio stylus which is not electrically connected to the digitizer 22 as a stylus 24, the invention is not limited to this particular embodiment. Alternatively, a wire associated stylus may also be used.

In summary, the present invention allows information to be easily selected from among a large number of pieces of information since the invention displays an enlarged portion of predetermined information on a display means. A kanji list is displayed on a display and, in case that the distance between the point of a stylus and the screen of a display is equal to or smaller than a predetermined value and greater than a predetermined value, a plurality of kanji characters which were displayed in a predetermined area corresponding to the plane position of the point of the stylus are displayed in an enlarged form. In addition, in case that said distance becomes equal to or smaller than a predetermined value, a plurality of kanji characters which were displayed in said predetermined area are fixedly displayed in an enlarged form and, in case that the point of the stylus is lifted up from the screen after the point of the stylus comes in contact with the screen, it is determined that the kanji character which is displayed at the remote position is to be selected.

While the invention has been particularly shown and described with reference to a preferred embodiment, it will be understood by those skilled in the art that various changes in form and detail may be made therein without departing from the spirit and scope of the invention.

We claim:

1. A system for selecting objects on a screen comprising:

a display means for displaying objects on a screen, a substantially pen-shaped pointing means for pointing to a position on a screen, a detection means for detecting both the plane position of the point of said pointing means and the distance between the point of said pointing means and the screen of said display means, and a control means for displaying a plurality of objects on the screen of said display means, said control means displaying objects in an enlarged form on said screen in a predetermined enlarged image area containing the predetermined position on the screen corresponding to said plane position when the distance detected by said detection means is less than or equal to a first predetermined value and greater than a second predetermined value, said second value being smaller than said first predetermined value, said control means fixing the enlarged objects displayed in said enlarged image area regardless of the change in plane position detected by said detection means when said distance detected by said detection means is less than or equal to said second predetermined value, and said control means selecting the object at the position on said screen pointed to by said pointing means when a selecting action is taken.

2. A system as set forth in claim 1, wherein a selecting action occurs when the point of said pointing means comes in contact with the surface of said screen.

3. A system as set forth in claim 1, wherein a selecting action occurs when the point of said pointing means is lifted up from the surface of said screen.

4. A system as set forth in claim 1 wherein, in the state where said display means displays objects in an enlarged form, said control means cancels said state when the plane position detected by said detection means goes out of the enlarged image area.

5. A system as set forth in claim 1 wherein, in the state where said display means displays objects in an enlarged form, said control means cancels said state when the distance detected by said detection means is greater than said first predetermined value.

6. A system as set forth in claim 1 wherein said objects are a large number of kanji characters and said control means selects the kanji character at the position on said screen pointed by said pointing means when a selecting action is taken.

7. A system in claim 1 wherein said displayed objects represent a map and said control means selects the geographic information at the position on said map pointed by said pointing means when a selecting action is taken.

8. A system as set forth in claim 1, wherein said control means moves the enlarged image area in accordance with the change in the plane position detected by the detection means when said distance detected by the detection means is less than or equal to said first predetermined value and greater than said second predetermined value, and displays the objects contained in the moving enlarged image area in an enlarged form.

9. A method for selecting objects on a screen, said method comprising the steps of:

displaying objects on a screen of a display means;

displaying a preselected number of the objects in an enlarged form in a predetermined enlarged image area containing the position on the screen corresponding to the plane position of the point of a substantially pen-shaped pointing means when the distance between the point of said pointing means and the screen of said display means is equal to or smaller than a first predetermined value and greater than a second predetermined value which is smaller than said first predetermined value;

fixing the state where the objects displayed in said enlarged image area are displayed in an enlarged form regardless of the change of the plane position of the point of said pointing means when said distance is less than or equal to said second predetermined value; and selecting the object displayed at the position pointed to by said pointing means.

10. The method in claim 9, wherein selecting the object displayed at the position pointed to by said pointing means occurs when the point of said pointing means comes in contact with the surface of said screen.

11. The method in claim 9, wherein selecting the object displayed at the position pointed to by said pointing means occurs when the point is lifted from the surface of said screen.

12. The method of claim 9, further comprising the step of updating and moving said enlarged image area corresponding to the position of said point of said pointing means when the point of said pointing means is less than or equal to said first predetermined value and greater than said second predetermined value, and a change in the plane position is detected by the detection means, wherein the objects displayed in the enlarged image area are located in proximity of the plane position.

* * * * *